United States Patent [19]
Nakagawa et al.

[11] Patent Number: 5,915,684
[45] Date of Patent: Jun. 29, 1999

[54] SHEET SUPPLYING APPARATUS

[75] Inventors: Daigo Nakagawa, Tokyo; Toshiaki Saito, Yokohama; Akemi Nishimaki, Kawasaki, all of Japan

[73] Assignee: Canon Kabushiki Kaisha, Tokyo, Japan

[21] Appl. No.: 08/813,637

[22] Filed: Mar. 7, 1997

[30] Foreign Application Priority Data

Mar. 13, 1996 [JP] Japan ................................. 8-055755

[51] Int. Cl.⁶ .................................................. B65H 7/08
[52] U.S. Cl. ........................ 271/110; 271/121; 271/122
[58] Field of Search ................................. 271/110, 121, 271/122, 245, 246, 10.11, 10.12

[56] References Cited

U.S. PATENT DOCUMENTS

| | | | |
|---|---|---|---|
| 4,674,736 | 6/1987 | Tsubo | 271/122 |
| 4,750,853 | 6/1988 | Van Soest et al. | 271/246 |
| 5,165,677 | 11/1992 | Shinada | 271/245 |
| 5,470,052 | 11/1995 | Asakawa et al. | 271/122 |

FOREIGN PATENT DOCUMENTS

| | | |
|---|---|---|
| 0 576 035 | 6/1993 | European Pat. Off. . |
| 0 625 840 | 5/1994 | European Pat. Off. . |
| 0 659 009 | 12/1994 | European Pat. Off. . |
| 405338825 | 12/1993 | Japan ................... 271/122 |
| 405338865 | 12/1993 | Japan ................... 271/245 |

*Primary Examiner*—H. Grant Skaggs
*Attorney, Agent, or Firm*—Fitzpatrick, Cella, Harper & Scinto

[57] ABSTRACT

The present invention provides a sheet supplying apparatus with a sheet stacking plate on which a plurality of sheets can be stacked, a sheet supply unit for successively supplying the sheets rested on the sheet stacking plate one by one, and a sheet regulating device for regulating a tip end of the sheet stack rested on the sheet stacking plate. The sheet supply unit has a rotary member and the rotary member has a cooperation portion for switching regulation and release of the tip end of the sheet stack by the sheet regulating device. Further, when the rotary member is rotated in a sheet conveying direction, the sheet regulating device is shifted by the cooperation portion to a position where the regulation of the tip end of the sheet stack is released.

27 Claims, 14 Drawing Sheets

SHEET SUPPLYING APPARATUS

BACKGROUND OF THE INVENTION

1. Field of the Invention

The present invention relates to a sheet supplying apparatus for successively supplying sheets rested on a stacking plate one by one and an image forming apparatus, and more particularly, it relates to a sheet supplying apparatus for supplying, for example, an original to be read or a recording sheet to be recorded to a reading means or a recording means of an image forming apparatus such as a facsimile, respectively.

2. Related Background Art

Conventionally, in image forming apparatus such as facsimile systems, a sheet supplying apparatus for supplying an original to be read or a recording sheet to be recorded to a reading means or a recording means of the image forming apparatus, respectively, has been provided with a sheet penetration preventing mechanism. By providing such sheet penetration preventing mechanism, when a sheet stack is set on a stacking plate, a tip end of the sheet stack is prevented from excessive penetrating into the apparatus, thereby preventing sheet jam and poor sheet supply such as double-feed.

More specifically, the sheet penetration preventing mechanism is designed so that a sheet penetration preventing member is driven and released by a long gear train associated with a convey gear. Further, in order to initialize the sheet penetration preventing mechanism, the latter is provided with a cam incorporated into the long gear train associated with the convey gear.

However, in the above-mentioned conventional example, as mentioned above, since the arrangement is complex, the cost is greatly increased, and, thus, the mechanism cannot be incorporated into a cheat sheet supplying apparatus.

SUMMARY OF THE INVENTION

The present invention aims to eliminate the above-mentioned conventional drawback, and an object of the present invention is to prevent poor sheet supply due to excessive penetration of a tip end of a sheet stack when the sheet stack is set and to permit an operator to set the sheet stack easily, with a cheap and simple arrangement.

To achieve the above object, according to the present invention, there is provided a sheet supplying apparatus comprising a sheet stacking plate on which a plurality of sheets can be stacked, a sheet supply means for successively supplying the sheets rested on the sheet stacking plate one by one, and a sheet regulating means for regulating a tip end of the sheet stack rested on the sheet stacking plate. The sheet supply means has a rotating rotary member and the rotary member has a cooperation portion for switching regulation and release of the tip end of the sheet stack by the sheet regulating means. Further, when the rotary member is rotated in a sheet conveying direction, the sheet regulating means is shifted by the cooperation portion to a position where the regulation of the tip end of the sheet stack is released.

In addition, when the rotary member is rotated in a reverse direction opposite to the sheet conveying direction, the sheet regulating means is returned, by the cooperation portion, to an initial position where the tip end of the sheet stack is regulated. More particularly, the rotary member is a driven rotary member urged against a drive rotary member and rotated by rotation of the drive rotary member, and the cooperation portion is a projection provided on the driven rotary member.

With this arrangement, the poor sheet supply due to excessive penetration of the tip end of the sheet stack in the setting operation of the sheet stack can be prevented with a cheat and simple arrangement, and the operator can easily set the sheet stack.

Further, when the driven rotary member is rotated in the reverse direction opposite to the sheet conveying direction, the projection abuts against the sheet regulating means to be stopped, with the result that the drive rotary member is rotated while sliding on an outer peripheral surface of the driven rotary member. Thus, since this arrangement acts as a torque limiter, an expensive torque limiter can be omitted, thereby making the apparatus cheaper.

Further, the fact that the driven rotary member is stopped by abutting the projection against the sheet regulating means is utilized to detect a position of the driven rotary member. With this arrangement, since the projection of the driven rotary member is held at a predetermined position, when the sheet supply is started, the sheet regulating means can release the regulation of the tip end of the sheet stack in a constant condition, and, any sensor for detecting the position of the driven rotary member can be omitted, the apparatus can be made cheaper.

In addition, the rotation control for returning the sheet regulating means to the initial position is performed by rotating the rotary member, firstly in the reverse direction, then in the sheet conveying direction, and lastly in the reverse direction again. With this arrangement, by rotating the rotary member in the sheet conveying direction after the rotary member is rotated in the reverse direction, the sheet regulating means is prevented from being lifted all the way, and, thereafter, by rotating the rotary member in the reverse direction again, the rotary member and the sheet regulating member can positively be returned to their initial positions.

Alternatively, the rotation control for returning the sheet regulating means to the initial position may be performed by rotating the rotary member in the reverse direction, then in the sheet conveying direction (normal direction) and lastly in the reverse direction again by one or more times. With this arrangement, in addition to the above-mentioned advantage, reliability is further improved. Further, by designing so that the initializing operation of the sheet regulating means is performed when the sheet stack is set, even after jam treatment is carried out (after an opening/closing cover is opened; in this case, the sheet regulating means is shifted), the rotary member and the sheet regulating means can surely be returned to their initial positions. Further, any sensor for detecting the opening and closing of the opening/closing cover can be omitted, thereby making the apparatus cheaper.

Furthermore, by designing so that the initializing operation of the sheet regulating means is performed when the presence of the sheet is detected by a sheet presence/absence sensor for presence/absence of the sheet on the sheet stacking plate, the same advantage as mentioned above can be obtained. Further, by repeating the initializing operation of the sheet regulating means by several times (more specifically, by performing the initializing operation of the sheet regulating means at the setting of the sheet stack and after all of the sheets are supplied), the same advantage as mentioned above can be obtained.

Further, during the initializing operation of the sheet regulating means, an amount of the rotation of the rotary member in the reverse direction is selected within 1.5 revolutions. With this arrangement, a load acting on a drive system for the rotary member and wear of the rotary member can be minimized, thereby increasing service lives of the drive system and the rotary member. In addition, during the initializing operation of the sheet regulating means, an amount of the rotation of the rotary member in the normal direction is selected within 1 revolution. With this arrangement, the initializing operation time can be minimized.

Furthermore, by designing so that the sheet regulating means is partially contacted with the sheet supply means in a waiting condition after the initialization (more specifically, a portion of the sheet regulating means is contacted with the rotary member in the waiting condition after the initialization), the sheet regulating means is fixedly held in the initial position not only by a weight of the sheet regulating means itself but also by the rotary member, thereby preventing the sheet regulating means from lifting at the setting of the sheet stack, and, thus, regulating the tip end of the sheet stack positively.

According to the present invention, the poor sheet supply due to the excessive penetration of the tip end of the sheet stack at the setting of the sheet stack can be prevented with a cheap and simple arrangement, and, thus, the operator can easily set the sheet stack without attention.

Further, during the reverse rotation of the driven rotary member, the projection abuts against the sheet regulating means to stop the driven rotary member and the drive rotary member is rotated while slipping on the peripheral surface of the driven rotary member. Since this arrangement acts as the torque limiter, any expensive torque limiter can be omitted, thereby making the apparatus cheaper.

In addition, since the fact that the projection abuts against the sheet regulating means to stop the driven rotary member is utilized to detect the position of the driven rotary member, the projection of the driven rotary member is held at the predetermined position, with the result that regulation of the tip end of sheet stack by means of the sheet regulating means can be released in the constant condition when the sheet supply is started. Further, since any sensor for detecting the position of the drive rotary member can be omitted, the apparatus can be made cheaper.

DETAILED DESCRIPTION OF THE PREFERRED EMBODIMENTS

Now, a sheet supplying apparatus according to an embodiment of the present invention and an image forming apparatus having such a sheet supplying apparatus will be explained with reference to the accompanying drawings. Incidentally, in embodiments which will be described later, the image forming apparatus is embodied as a facsimile, and the sheet supplying apparatus incorporated into the image forming apparatus is embodied as an automatic original supplying apparatus for supplying an original to be read.

[First Embodiment]

A sheet supplying apparatus and an image forming apparatus according to a first embodiment of the present invention will now be explained with reference to the accompanying drawings. First of all, a construction of a facsimile will be briefly described, and then, a construction and an operation of an automatic original supplying apparatus will be described.

Figure 4:
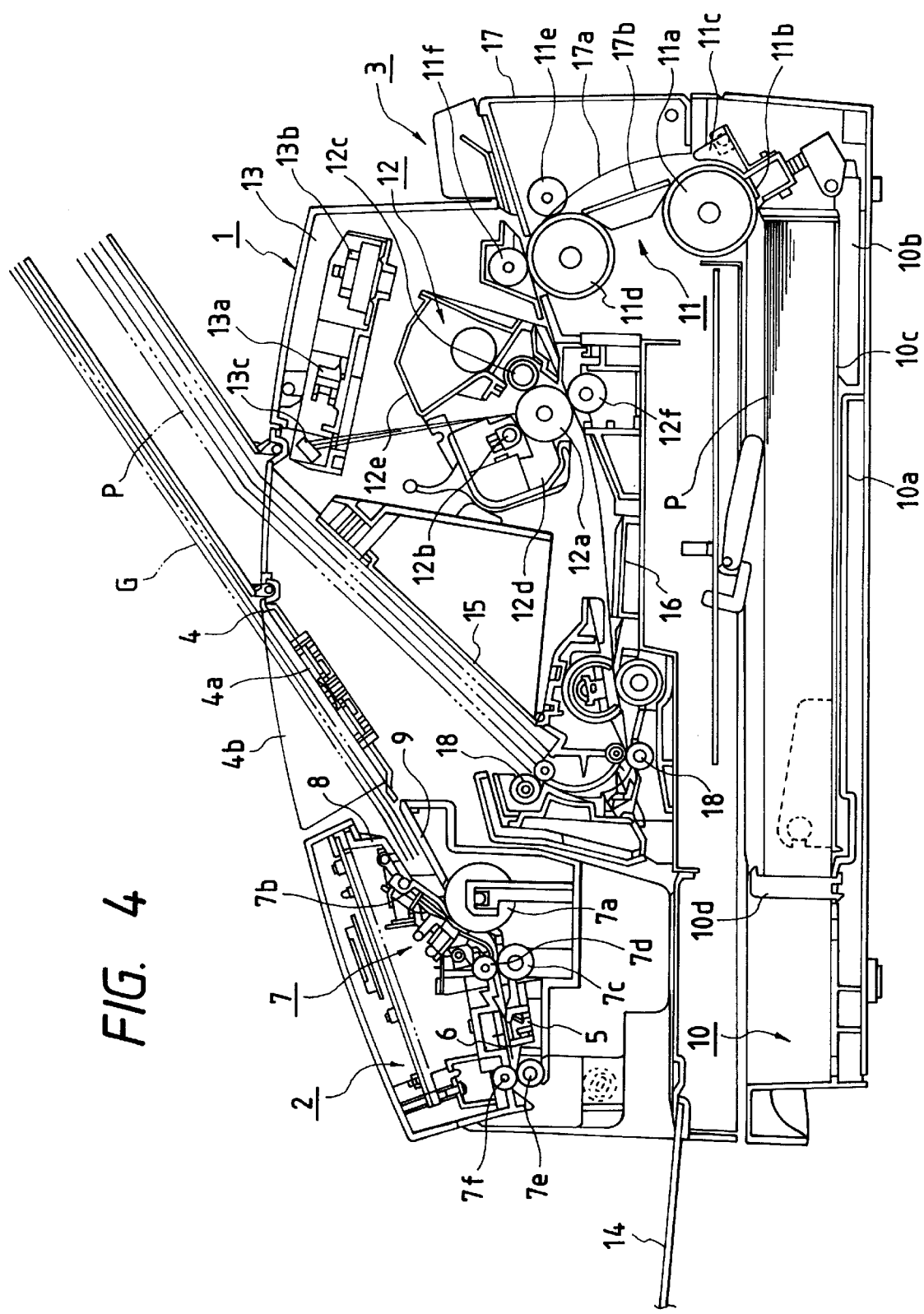
FIG. 4 is a sectional view of a facsimile having the automatic original supplying apparatus to which the present invention is applied.

In FIG. 4 showing a schematic construction of the facsimile, the facsimile 1 comprises an image reading portion 2 for reading an image on an original G (to be read), and an image recording portion 3 for recording an image on a recording sheet P (to be recorded).

The image reading portion 2 includes an upper cover 4 having an original stacking plate 4a on which a plurality of originals G can be stacked, an image sensor 5 of close contact type for reading the image information on the original G, an original urging portion 6 for urging the original G against the image sensor 5 of close contact type, an original convey portion 7 for successively supplying the originals G stacked on the original stacking plate 4a one by one and for conveying the original through the image sensor 5 of close contact type, and upper and lower original guides 8, 9 forming a convey path for the original G.

The upper cover 4 has the original stacking plate 4a and is attached to the facsimile 1 for opening and closing movement in order to facilitate replacement of a cartridge (described later) and a sheet jam treatment. Further, a slider 4b is provided on the original stacking plate 4a for sliding movement in a width-wise direction transverse to an original conveying direction so that both lateral edges of the originals G stacked on the original stacking plate 4a can be aligned with each other. The image sensor 5 of close contact type serves to illuminate light from an LED array (light source) onto an image information surface of the original G and read the image information by focusing the light reflected from the image information surface onto a sensor element by means of a SELFOC (registered trade mark) lens.

Incidentally, the original convey portion 7 of the automatic original supplying apparatus to which the present invention is applied will be described later.

The image recording portion 3 includes a cassette portion 10 for stacking and containing the recording sheets P, a recording sheet supply portion 11 for successively supplying the recording sheets P one by one from the cassette portion 10, an image forming portion 12 for recording an image on the recording sheet P supplied from the supply portion, a laser scanner 13 for illuminating light (image information) onto the image forming portion 12, a discharge tray 14 for stacking and collecting the originals G discharged after reading or the recording sheets P discharged after recording, a recording sheet discharge plate 15 for stacking and collecting the recording sheets P discharged in a U-turn manner after recording, and a convey guide 16 for guiding and supporting the recording sheet P being conveyed. Incidentally, in FIG. 4, the reference numeral 17 denotes a side cover.

The cassette portion 10 is disposed at a bottom of the facsimile. The recording sheets P stacked and contained in a cassette 10a are urged against a separation roller 11a by means of an intermediate plate 10c biased upwardly by an urging member 10b. When the sheet supply is against the recording sheets P urged against the separation roller 11a are separated one by one by the separation roller 11a and a separation pad 11b urged against the separation roller, and the separated recording sheet is conveyed in a downstream direction along a separation guide 11c. Then, the recording sheet is conveyed in a U-turn manner along a convey path defined by a cover side U-turn guide 17a provided on the side cover 17 and a body side U-turn guide 17b provided on a body of the facsimile 1. Then, the recording sheet is conveyed between a photosensitive drum 12a and a transfer means 12f in the image forming portion 12 by a convey roller 11d and driven convey sub-rollers 11e, 11f urged against the convey roller, in such a manner that a tip end of the recording sheet P is aligned with a tip end of an image (toner image) formed in the image forming portion 12.

Incidentally, in the cassette portion 10, the cassette 10a capable of containing a plurality of recording sheets P is provided with a shiftable trail end regulating plate 10d for regulating trail ends of the recording sheets in accordance with a size of the recording sheet. Further, in the illustrated embodiment, the cassette portion 10 includes the cassette 10a capable of containing about 250 recording sheets and retractable toward a front side of the facsimile (front loading type). A recording sheet having an A4 size, a LETTER size or a REGAL size can be contained in the cassette.

In the image forming portion 12, first of all, a laser beam (image signal) is emitted from a laser beam generator 13a of the laser scanner 13 in response to an image signal. The laser beam is illuminated onto the photosensitive drum 12a of the image forming portion 12 through a polygon mirror 13b and a reflection mirror 13c, thereby forming the image on the photosensitive drum 12a.

In the image forming portion 12, the photosensitive drum 12a is assembled in a cartridge frame together with a charge means 12b, a developing means 12c and a cleaning means 12d which act on the photosensitive drum as process means, thereby forming a process cartridge 12e. The process cartridge 12e can removably be mounted on the facsimile 1. Accordingly, during the image formation, the laser beam from the laser scanner 13 is illuminated onto the photosensitive drum 12a uniformly charged by the charge means 12b, thereby forming a latent image which is in turn visualized (developed) with toner from the developing means 12c to form the toner image.

Further, in the image forming portion 12, a transfer means 12f for transferring the toner image formed on the surface of the photosensitive drum 12a onto the recording sheet P is disposed around the photosensitive drum 12a, and a fixing means 12g for fixing the transferred toner image to the recording sheet P is disposed in the recording sheet convey path at a downstream side of the photosensitive drum 12a. Incidentally, the reference numeral 18 denotes discharge rollers.

Accordingly, after the toner image is transferred, by the transfer means 12f, to the recording sheet P supplied from the cassette portion 10 to the image forming portion 12 at the predetermined timing, the recording sheet is conveyed along the convey guide 16 to the fixing means 12g, where the toner image is fixed to the recording sheet. Thereafter, the recording sheet is discharged on the discharge tray 12 or the recording sheet discharge plate 15 by means of the discharge rollers 18.

Incidentally, if the sheet jam occurs, by opening the opening/closing cover such as the upper cover 4 and or the side cover 17, the operator can easily remove the jammed recording sheet P.

Figure 6:
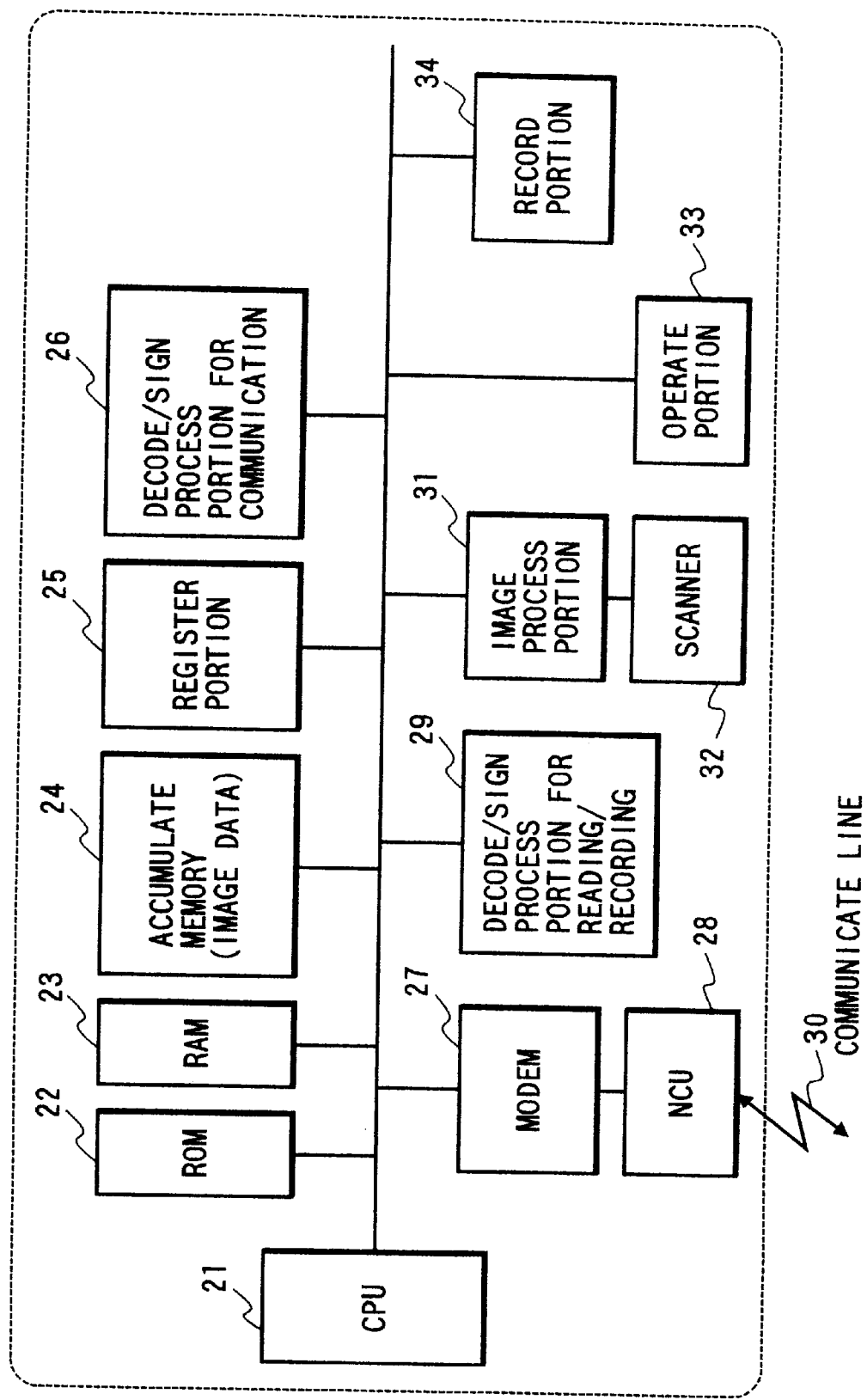
FIG. 6 is a system block diagram of the facsimile.

FIG. 6 is a system block diagram of the facsimile. In FIG. 6, a CPU 21 constitutes a system control portion for controlling the entire facsimile. A ROM 22 serves to store a control program for the CPU 21. If necessary, a RAM 23 is used as a work area. An accumulate memory 24 is constituted by a DRAM and the like and serves to store the image data. A register portion 25 is constituted by an SRAM and serves to store set values which are read out from the register portion when the control is performed. There are provided a decode/sign process portion 26 for communication and a decode/sign process portion 29 for reading/recording, and these decode/sign process portions serve to perform respective decode/sign processes.

An operate portion 33 is constituted by a display portion, a keyboard and the like and is used by the operator to input various data. A MODEM (modulator-demodulator) 27 serves to modulate and demodulate communication signals of the facsimile. An NCU (net control unit) 28 has a function for sending a selection signal (dial pulse or tone dial) to a communicate line 30 and serves to perform an automatic arrival signal operation and a line control operation by detecting a call sound.

A scanner 32 (image reading portion) 2 is constituted by an image sensor of close contact type (CS), an original convey portion and the like and serves to optically read the original and convert it to electrical image data. The image data is corrected by an image process portion 31 and is outputted as fine image data. A recording portion 34 (image recording portion 3) is constituted by a laser beam printer or an ink jet printer and serves to output the fine image data produced in the decode/sign process portion 29.

Next, a construction and an operation of the original convey portion 7 as the automatic original supplying apparatus to which the present invention is applied will be explained.

Figure 1:
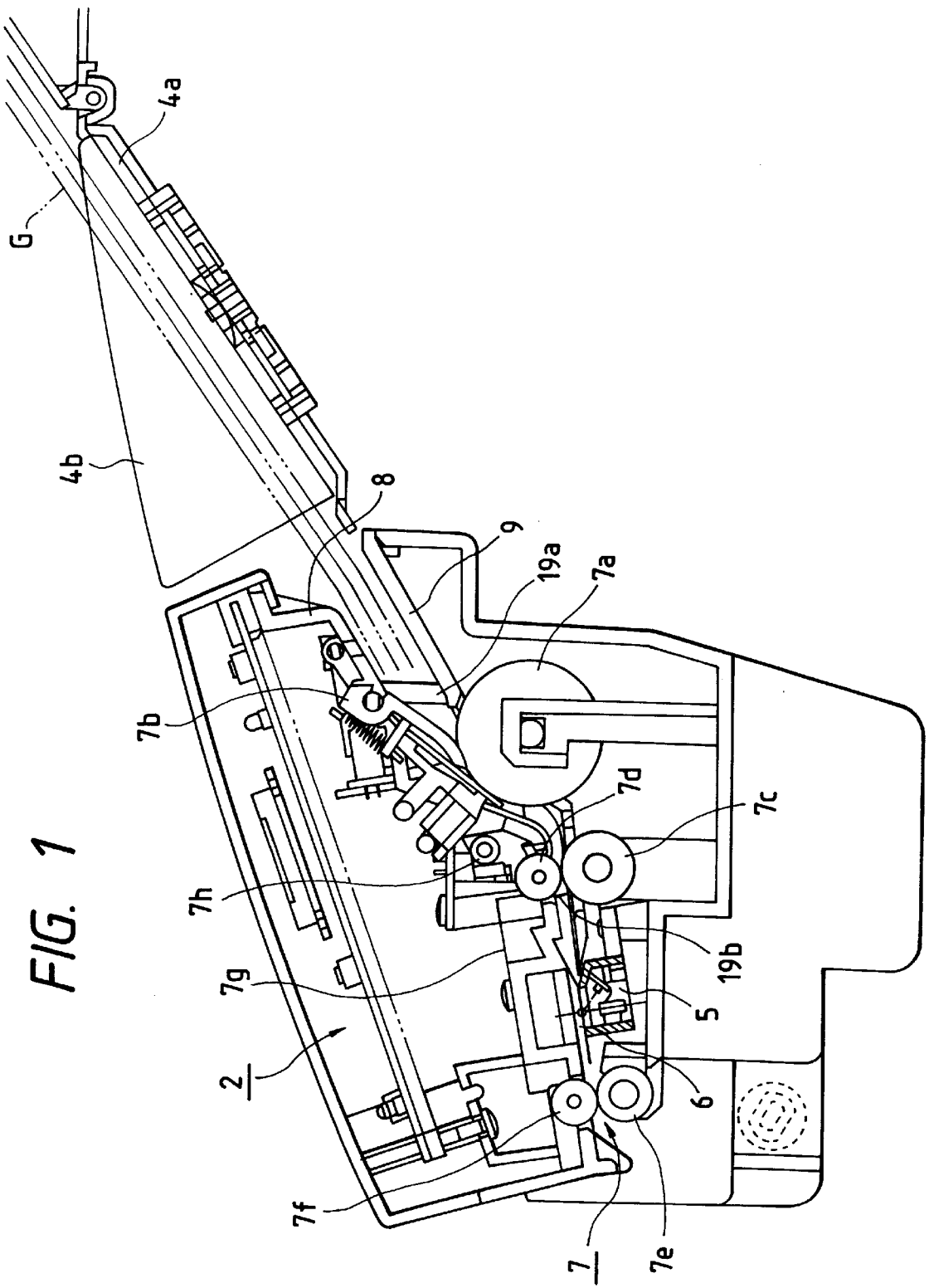
FIG. 1 is a sectional view of an automatic original supplying apparatus to which the present invention is applied.
Figure 2:
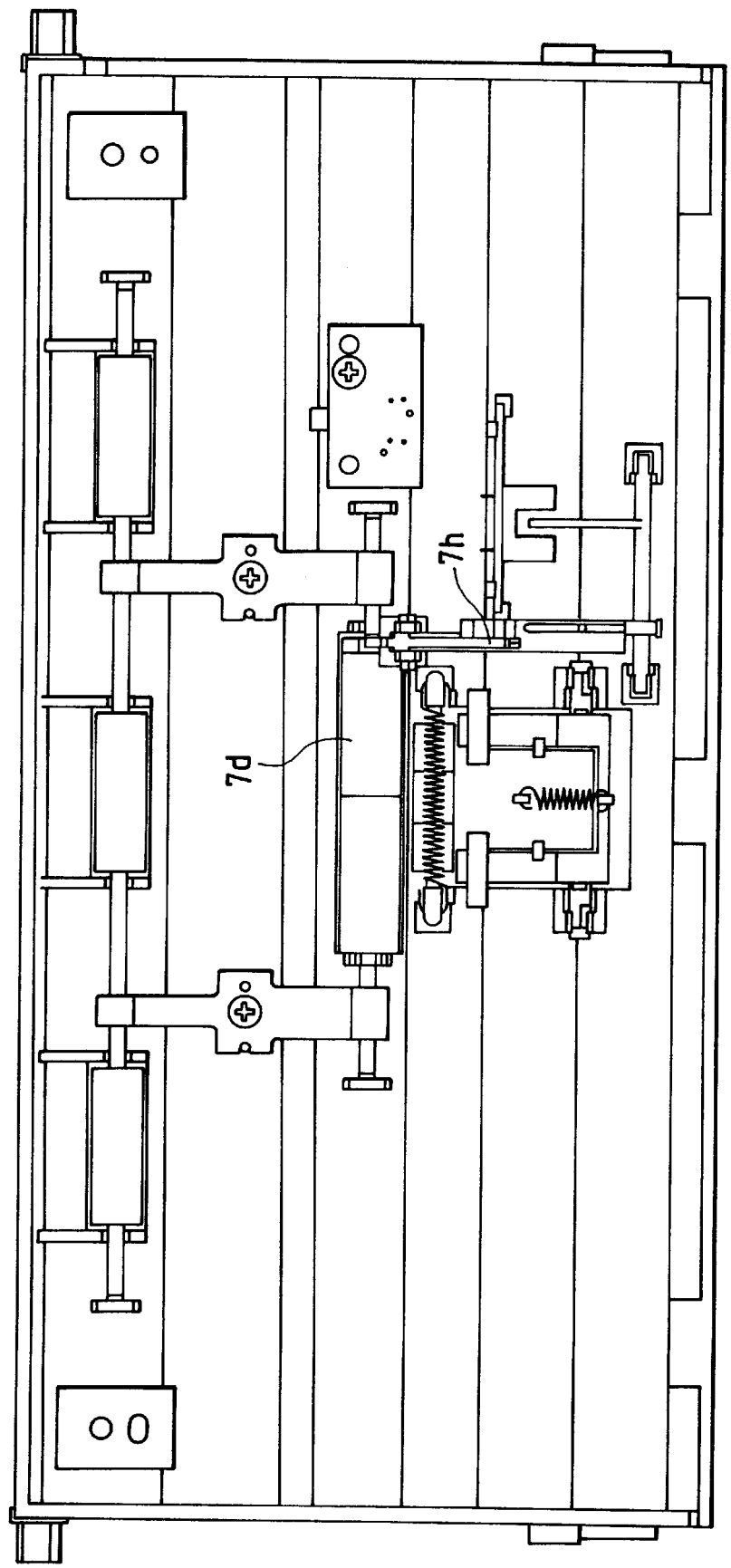
FIG. 2 is a plan view of the automatic original supplying apparatus.
Figure 3:
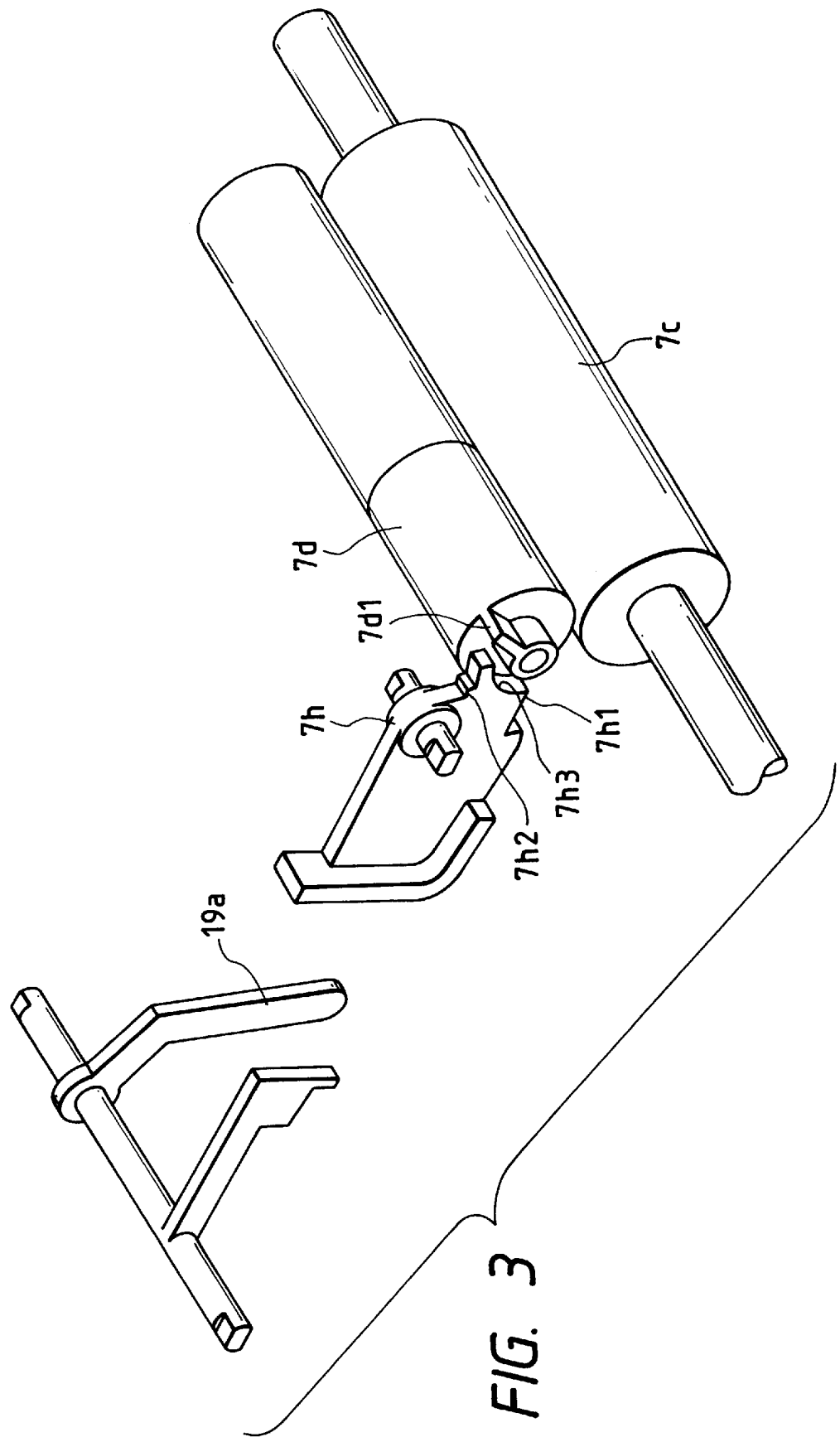
FIG. 3 is a perspective view showing a relation between a supply roller, a supply sub-roller and a stopper in the automatic original supplying apparatus.

As shown in FIGS. 1 to 3, the original convey portion (automatic original supplying apparatus) 7 serves to successively supply the originals G stacked on the original stacking plate 4a one by one and convey the original through the image sensor 5 of close contact type. The original convey portion 7 includes a separation roller 7a, a pre-urging arm 7b urged against the separation roller, a supply roller (drive rotary member) 7c, a supply sub-roller (driven rotary member) 7d urged against the supply roller 7c and driven by rotation of the supply roller, a convey sub-roller 7f urged against the supply sub-roller and driven thereby, a leaf spring 7g for urging the supply sub-roller 7d and the convey sub-roller 7f against the supply roller 7c and the convey roller 7e, respectively, and a stopper (regulating means) 7h for regulating/releasing tip ends of the originals stacked on the original stacking plate 4a. Further, the supply sub-roller 7d has a projection 7d1 for switching the regulation and release of the tip ends of the originals effected by means of the stopper 7h.

As will be fully described later, and, as shown in FIGS. 7A to 7C and 8A to 8D, the stopper 7h is designed so that, when the supply sub-roller 7d urged against the supply roller 7c and driven thereby is rotated in the original conveying direction, the stopper is shifted, by the projection 7d1, to a position where the regulation of the tip ends of the originals is released, and, when the supply sub-roller is rotated in the reverse direction opposite to the original conveying direction, the stopper is returned to an initial position where the tip ends of the originals are regulated.

Further, when the supply sub-roller 7d is rotated in the reverse direction opposite to the original conveying direction, the projection 7d1 abuts against the stopper 7h and is stopped there. In this condition, the supply roller 7c is rotated while slipping on an outer peripheral surface of the supply sub-roller 7d. In addition, the fact that the projection 7d1 abuts against the stopper 7h and is stopped there is utilized to detect an initial position of the supply sub-roller 7d.

That is to say, in the original convey portion having the above-mentioned arrangement, the originals G are firstly pinched between the separation roller 7a and the pre-urging arm 7b urged against the separation roller and then abut against the stopper 7h (now returned to the initial position, i.e., regulating position), thereby preventing further advancement of the originals. When the original supply is started, since the stopper 7h is shifted, by the projection 7d1 of the supply sub-roller 7d, to the position where the regulation of the tip ends of the original is released, the originals G on the original stacking plate 4a are separated one by one by means of the separation roller 7a and the pre-urging arm 7b urged against the separation roller. The separated original G is sent onto the image sensor of close contact type (CS) 5 by means of the supply roller 7c and the supply sub-roller 7d urged against the supply roller 7c by the leaf spring 7g.

Then, while the original is being conveyed line-by-line while being contacted with the image sensor of close contact type by the original urging portion 6, the image information is read by the image sensor. Thereafter, the original G is discharged onto the discharge tray 14 by means of the convey roller 7e and the convey sub-roller 7f urged against the convey roller 7e by the leaf spring 7g. Meanwhile, the original G is guided along the convey path defined by the upper original guide 8 and the lower original guide 9.

Next, an operation for returning the stopper 7h to the initial position will be explained with reference to FIGS. 7A to 7C, 8A to 8D and 9.

Figure 7A:
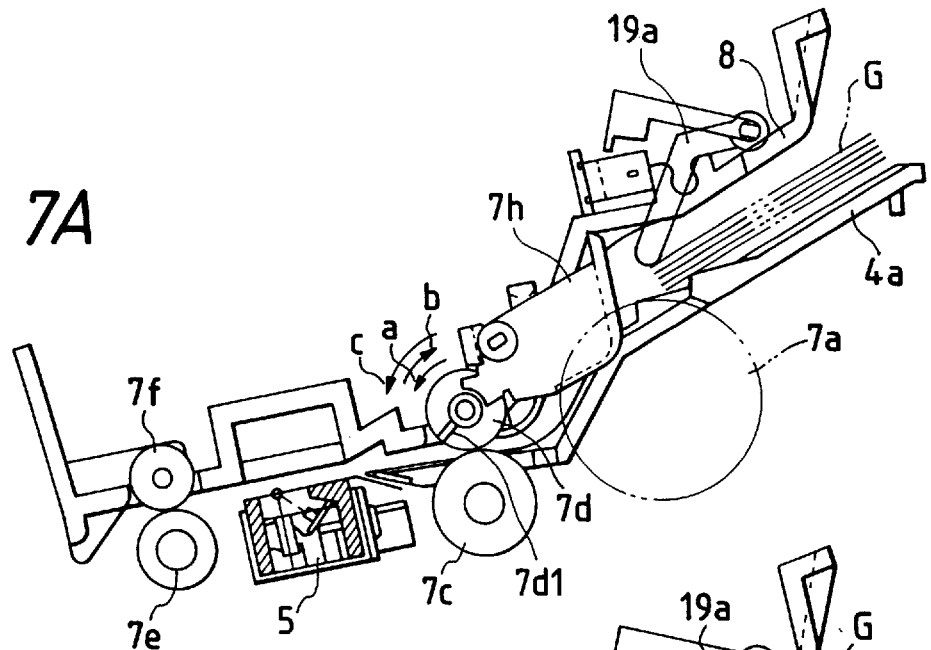
FIGS. 7A, 7B, 7C, 8A, 8B, 8C and 8D are views for explaining an operation of the automatic original supplying apparatus.
Figure 7B:
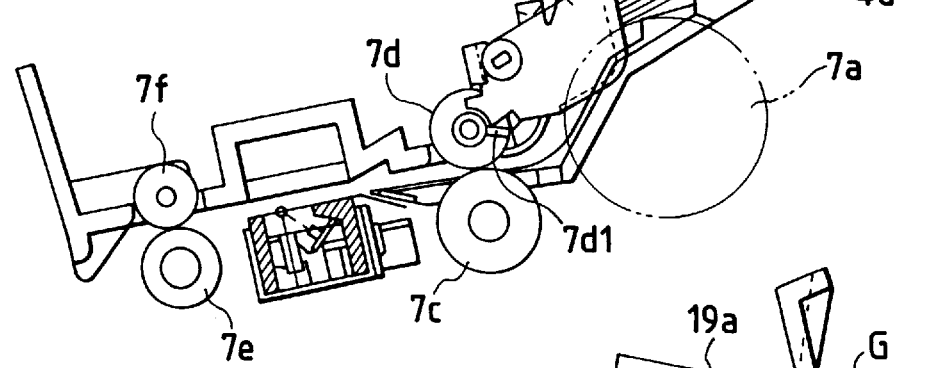

As shown in FIG. 7A, first of all, when the originals G are set on the original stacking plate 4a, the sensor (DS) 19a as the original presence/absence detecting means is turned ON, thereby starting the initialize operation. On the basis of the detection signal, rotation of a motor (drive source) M is controlled by the control portion 20 to rotate the motor in reverse-normal-reverse directions in order, and the supply roller 7c is rotated similarly by a driving force transmitted from the motor M. That is to say, after the supply sub-roller 7d urged against the supply roller 7c and driven thereby is rotated in the reverse direction (shown by the arrow a) opposite to the original conveying direction, it is rotated in the original conveying direction (shown by the arrow b), and then is rotated in the reverse direction (shown by the arrow c) again, thereby reaching a waiting condition. In this way, the reason for rotating the supply sub-roller is rotated in the reverse-normal-reverse directions in order will be described later. Thus, the projection 7d1 of the supply sub-roller 7d abuts against a hook 7h1 of the stopper 7h and is stopped there, with the result that the supply sub-roller 7d and the stopper 7h are returned to their initial positions, as shown in FIG. 7B. Consequently, even after the upper cover 4 is opened and the sheet jam treatment is performed, as shown in FIG. 7B, the stopper 7h can surely be returned to the initial position. Further, since any sensor for detecting the opening/closing of the upper cover can be omitted, the facsimile can be made cheaper.

Incidentally, although the rotation step numbers of motors differ from each other in dependence upon step angles of the respective motors, in the illustrated embodiment, reverse rotation of 120 steps, normal rotation of 120 steps and reverse rotation of 600 steps are used. That is to say, an amount of rotation of the supply sub-roller 7d rotated again in the reverse direction (opposite to the original conveying direction, i.e., direction c) becomes within 1.5 revolutions (of the supply sub-roller), and an amount of rotation of the supply sub-roller firstly rotated in the reverse direction (opposite to the original conveying direction, i.e., direction a) and an amount of rotation of the supply sub-roller rotated in the normal direction (direction b) become within 1 revolution. With this arrangement, any load acting on the motor and wear of the supply roller 7c can be minimized, thereby improving service lives of the motor and the supply roller and minimizing the initialization time.

Figure 7C:
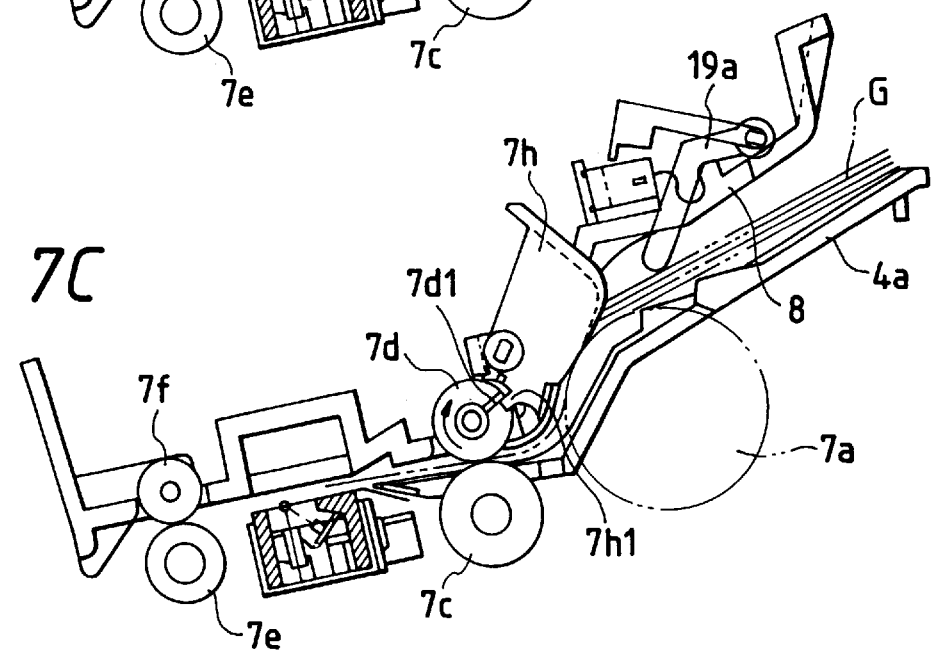
Figure 8A:
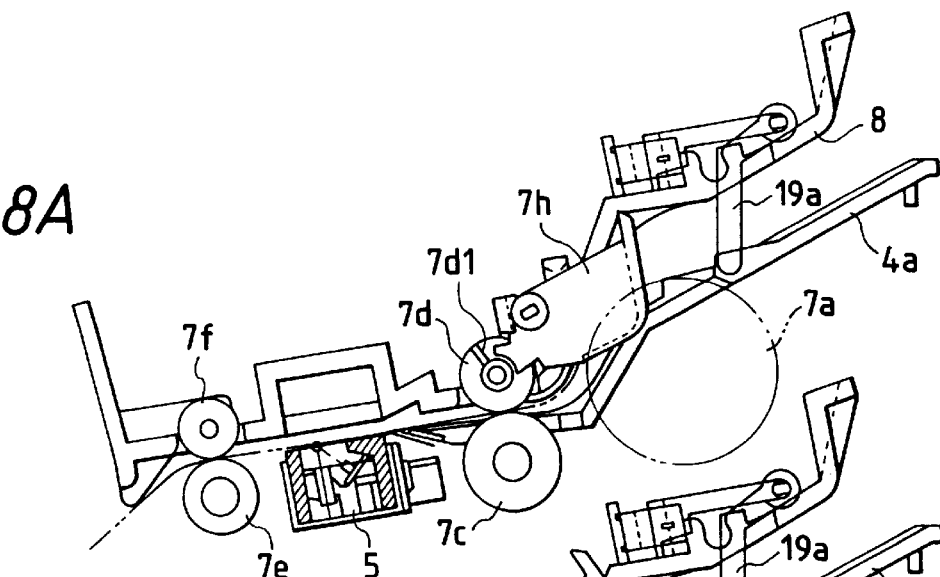
Figure 8B:
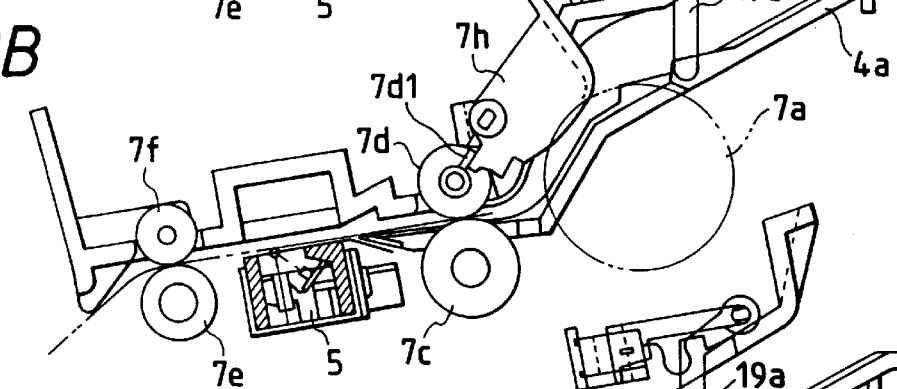

When a start button is depressed, the motor M is rotated in the normal direction with respect to the original conveying direction, with the result that, as shown in FIG. 7C, the supply sub-roller 7d is rotated in the original conveying direction. Consequently, the projection 7d1 of the supply sub-roller 7d abuts against the hook 7h1 of the stopper 7h. As a result, the stopper 7h is lifted, thereby shifting the stopper to the position where the regulation of the tip ends of the originals is released. Accordingly, the originals G stacked on the original stacking plate 4a can enter into between the separation roller 7a and the pre-urging arm 7b. When the projection 7d1 is further rotated to pass by the hook 7h1 thereby to release the regulation, the stopper 7h is contacted with the upper surface of the original stack rested on the original stacking plate 4a by its own weight. Thus, as shown in FIGS. 8A and 8B, the stopper 7h repeats its upward and downward movements alternately until the last original is discharged. That is to say, while supply sub-roller 7d is continuously rotated in the clockwise direction to intermittently abut the projection 7d1 of the supply sub-roller 7d against the stopper, the stopper is lifted to the release position, and, whenever the regulation is released, the stopper is contacted with the upper surface of the original stack rested on the original stacking plate 4a. When the last original is passed by the stopper 7h, the stopper 7h is lowered by its own weight.

Figure 8C:
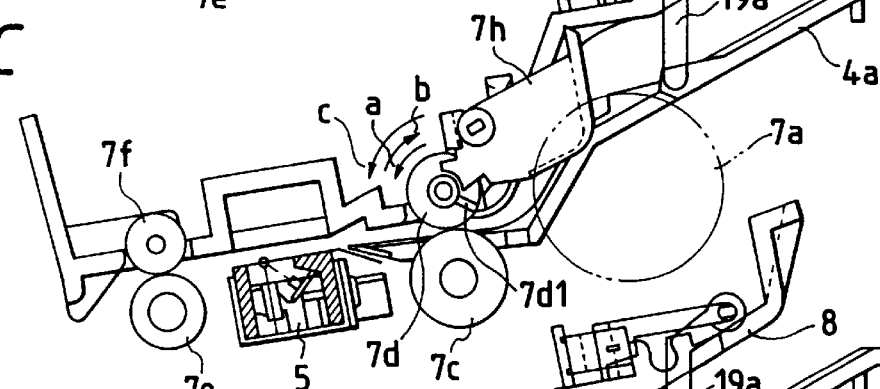
Figure 8D:
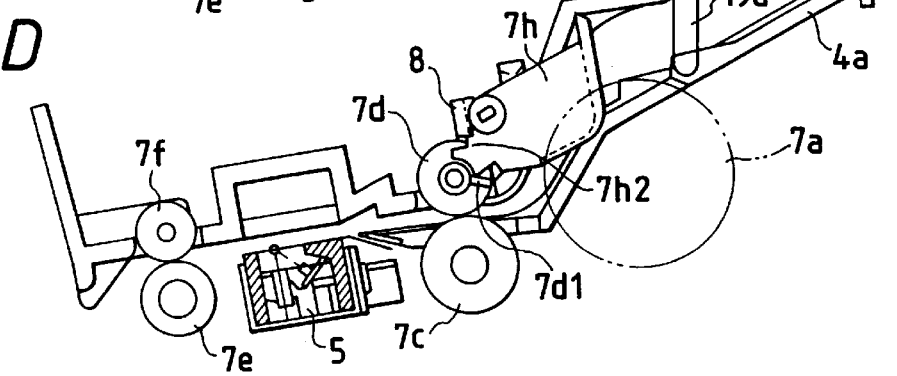
Figure 9:
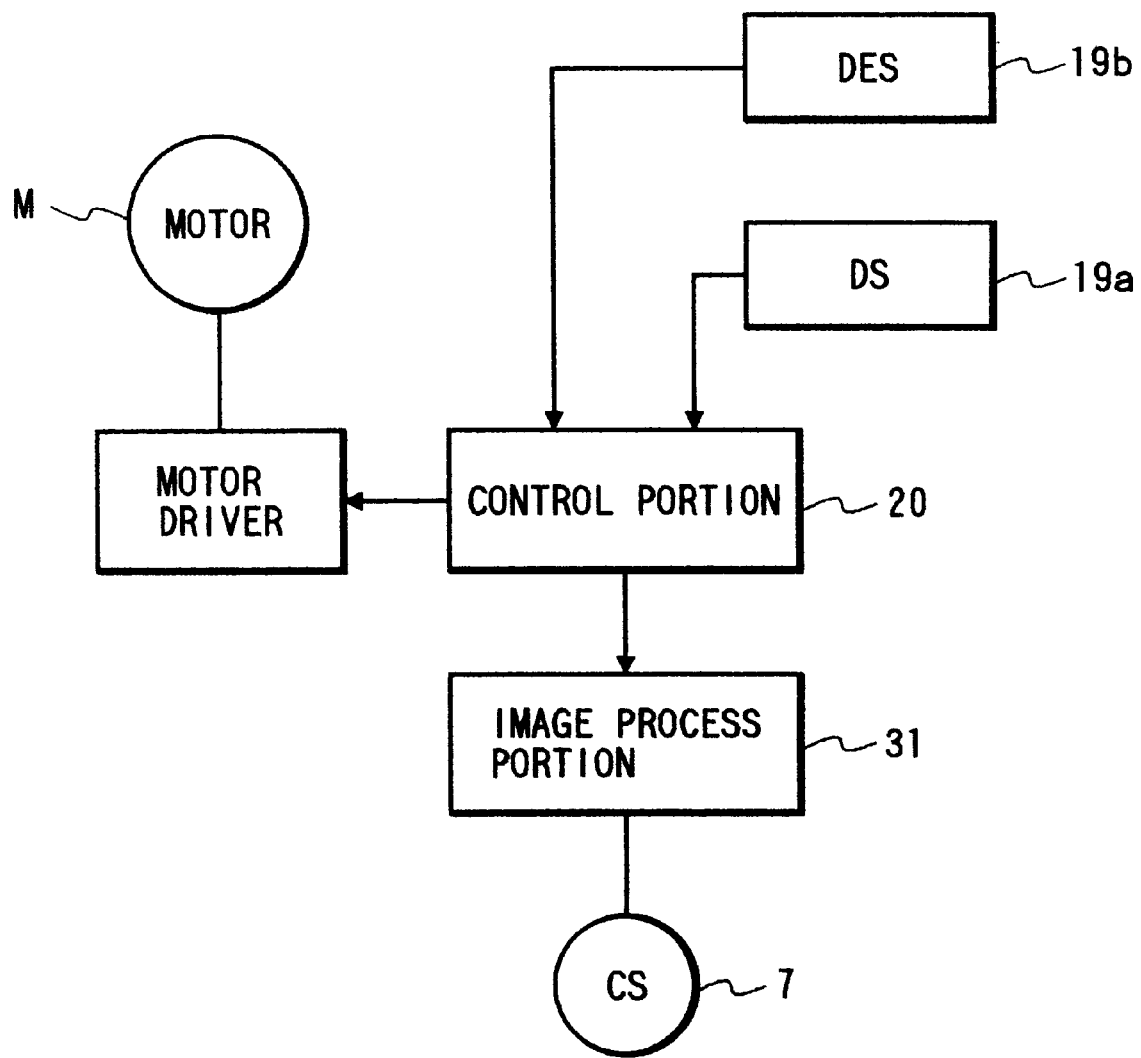
FIG. 9 is a control block diagram of the automatic original supplying apparatus.

When a predetermined time is elapsed after a sensor (DES) (original presence/absence detecting means) 19b shown in FIG. 1 is turned OFF, that is to say, when the reading of the original G is finished, the rotation of the motor M is controlled by the control portion 20 on the basis of the detection signal in such a manner that the motor is rotated in the normal direction by a predetermined steps after the motor is turned OFF, thereby conveying the original G by the convey roller 7e and the convey sub-roller 7f. After the original is conveyed, as mentioned above, the rotation of the motor M is controlled in the reverse-normal-reverse directions in order, so that, as shown in FIG. 8C, the supply sub-roller 7d is rotated in the reverse direction (direction a) opposite to the original conveying direction and then in the original conveying direction (direction b) and lastly in the reverse direction (direction c) again. That is to say, the initializing operation is performed, with the result that the supply sub-roller 7d and the stopped 7h are returned to their initial positions to reach the waiting condition, as shown in FIG. 8D. In this way, by performing the initializing operation of the stopper 7h by several times, more specifically, by two times (at the setting of the originals and after the original are all discharged), the supply sub-roller 7d and the stopper 7h can surely be returned to their initial positions (waiting condition). The reason therefor will be described later.

Figure 10:
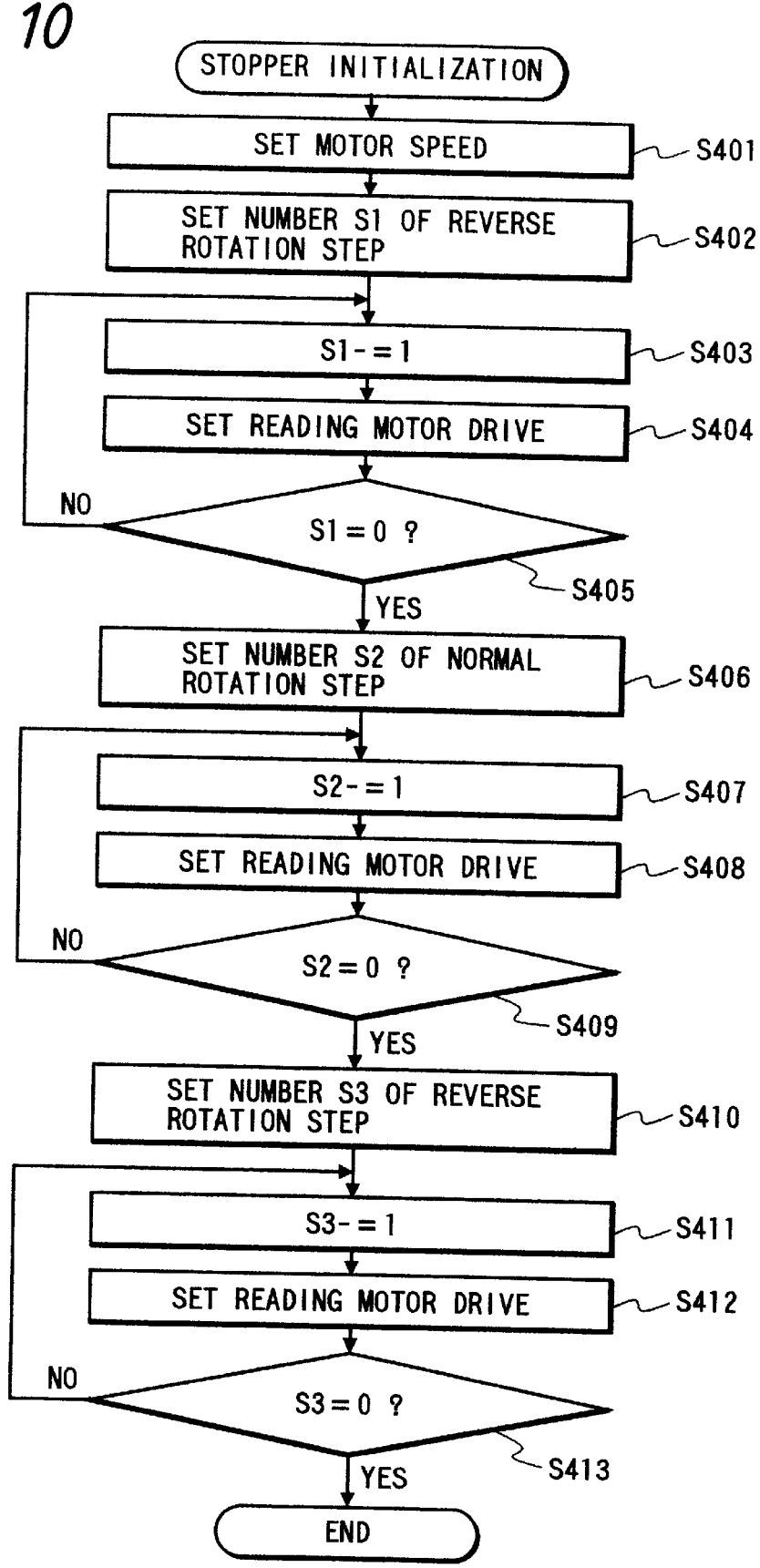
FIG. 10 is a flow chart showing initialization control for the stopper in the facsimile.

Incidentally, FIG. 10 shows a flow chart indicating the initializing operation of the stopper 7h. In correspondence to the operations shown in FIGS. 7A to 7C and 8A to 8D, in steps S401 to S405, the motor M is rotated in the reverse direction to rotate the supply sub-roller 7d in the reverse direction (direction a) opposite to the original conveying direction. Then, in steps S406 to S409, the supply sub-roller is rotated in the original convey direction (direction b), and, in steps S410 to S413, the supply sub-roller is lastly rotated in the reverse direction (direction c), thereby returning the supply sub-roller 7d and the stopper 7h to their initial position (waiting condition).

Next, the fact that the slipping movement between the supply roller 7c and the supply sub-roller 7d during the initializing operation of the stopper 7h is utilized as a torque limiter will be explained with reference to FIG. 11.

Figure 11:
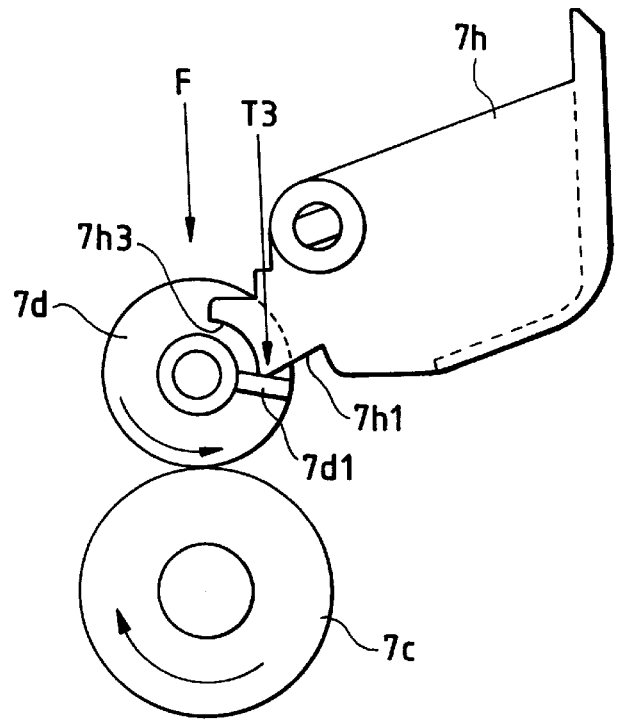
FIG. 11 is an explanatory view for explaining a principle that slip between the supply roller and the supply sub-roller is utilized as a torque limiter.

As shown in FIG. 11,having they sub-roller 7d having the integral projection 7d1 is urged against the supply roller 7c by the leaf spring 7g with a force F. During the rotation of the supply sub-roller in the reverse direction (shown by the arrow) opposite to the original conveying direction, when the projection 7d1 of the supply sub-roller 7d is subjected to a force corresponding to torque T3, the supply roller 7c starts to rotate while sliding on the peripheral surface of the supply sub-roller 7d. Further, the fact that the supply sub-roller 7d is stopped by the stopper after the projection 7d1 of the supply sub-roller 7d is subjected to the force corresponding to torque T3 is utilized to detect the position of the supply sub-roller 7d. Thus, during the rotation of the supply sub-roller in the reverse direction opposite to the original conveying direction, since the projection 7d1 of the supply sub-roller 7d abuts against the hook 7h1 of the stopper 7h and a positioning portion 7h2 of the stopper abuts against the original guide 8 to stop the stopper (FIG. 8D), the supply roller 7c starts to rotate while sliding on the peripheral surface of the supply sub-roller 7d. As a result, the supply sub-roller 7d and the stopper 7h can surely be returned to their initial positions. Further, it is assumed that slip start torque is T2 and maximum release torque for releasing the stopper 7h during the normal rotation at the maximum original stacking condition is T1, a relation between the torque values is selected to T1<T2<T3. However, the slip start torque T2 is selected within a range that the motor does not become out of phase.

Figure 12:
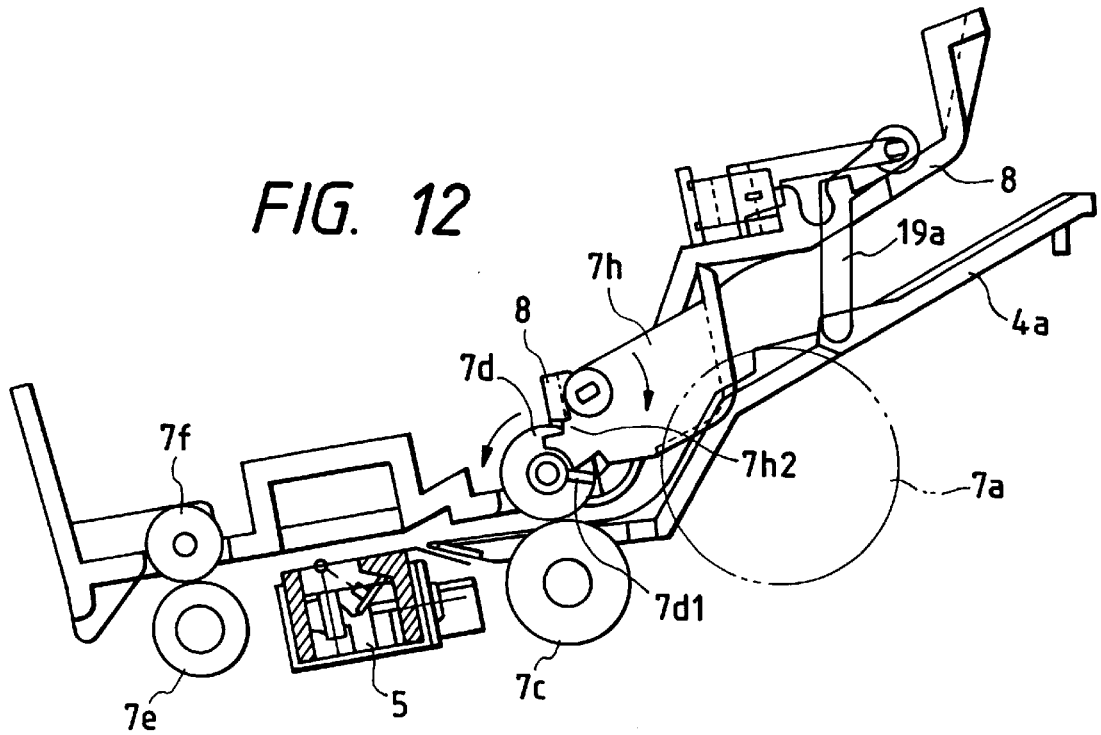
FIG. 12 is an explanatory view showing a method for fixedly holding the stopper of the automatic original supplying apparatus in a waiting condition.

Next, a method for keeping the stopper 7h in the waiting condition after the initialization will be explained with reference to FIG. 12.

When the motor M is rotated in the reverse direction, the supply sub-roller 7d is rotated in the reverse direction (shown by the arrow in FIG. 12) opposite to the original conveying direction. As a result, since the projection 7d1 of the supply sub-roller 7d abuts against the hook 7h1 of the stopper 7h and the positioning portion 7h2 of the stopper 7h abuts against the upper original guide 8 to stop the stopper there, the supply sub-roller 7d is stopped at a position as shown. From this point, the supply roller 7c start to slip on the supply sub-roller while rotating. The stopper 7h is contacted with the supply sub-roller 7d at the initial position (regulating position), and therefore, the stopper 7h is kept in the waiting position by the supply sub-roller 7d while being biased toward a direction shown by the arrow. Thus, at the setting of the originals, the stopper 7h is prevented from lifting, thereby the penetration of the original stack positively.

Figure 13A:
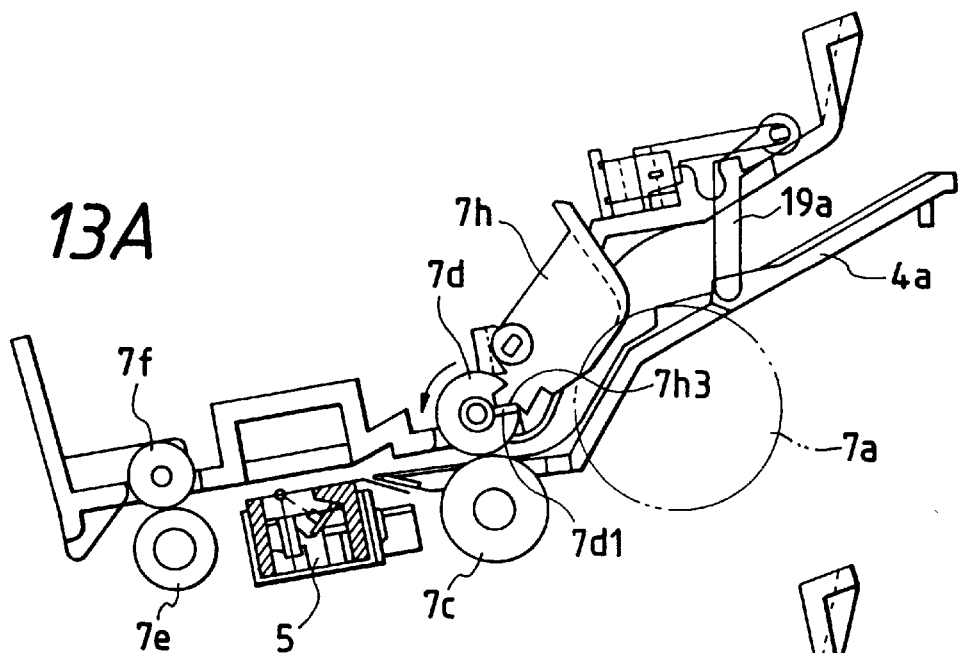
FIGS. 13A, 13B and 13C are views for explaining a mechanism for preventing the stopper of the automatic original supplying apparatus from lifting all the way.
Figure 13B:
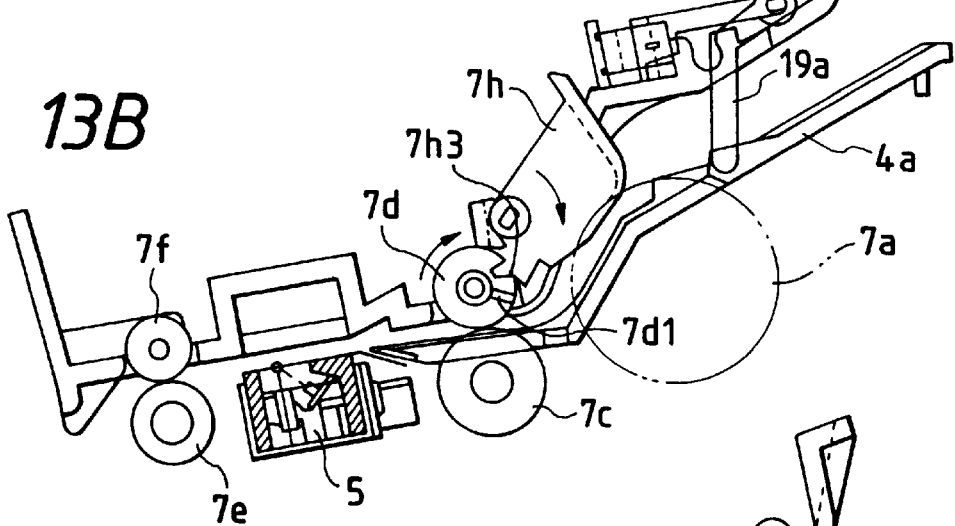
Figure 13C:
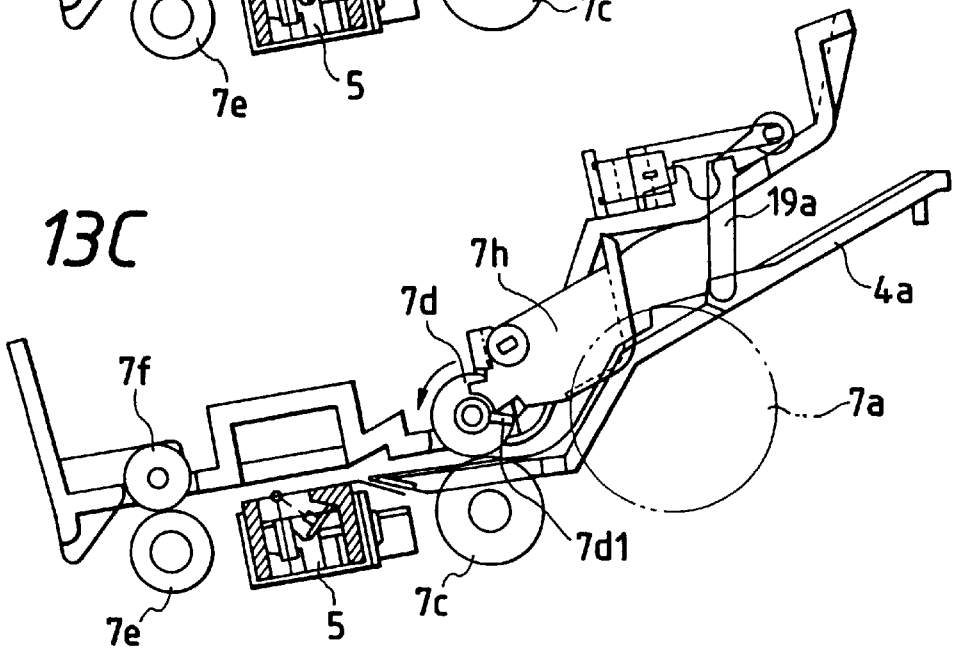

Next, a method for preventing the stopper 7h from lifting all the way (i.e., the reason for performing the reverse-normal-reverse rotations) will be explained with reference to FIGS. 13A to 13C.

After the last original is discharged, the motor M starts to rotate in the reverse direction for the initialization. However, depending upon the timing, as shown in FIG. 13A, the projection 7d1 of the supply sub-roller 7d may be fitted into a recess 7h3 of the stopper 7h. When the supply sub-roller 7d is rotated in the reverse direction, if the projection 7d1 is fitted into the recess 7h3 of the stopper 7h, as shown in FIG. 13B, the motor M may be rotated in the normal direction (within one revolution of the supply sub-roller). Consequently, the projection 7d1 of the supply sub-roller 7d is disengaged from the recess 7h3 of the stopper 7h, with the result that the stopper 7h can be lowered by its own weight. Thereafter, when the motor M is rotated in the reverse direction again (within 1.5 revolutions of the supply sub-roller), as shown in FIG. 13C, the supply sub-roller 7d and the stopper 7h can surely be returned to their initial positions. With this arrangement, the stopper 7h is prevented from lifting all the way.

Figure 14:
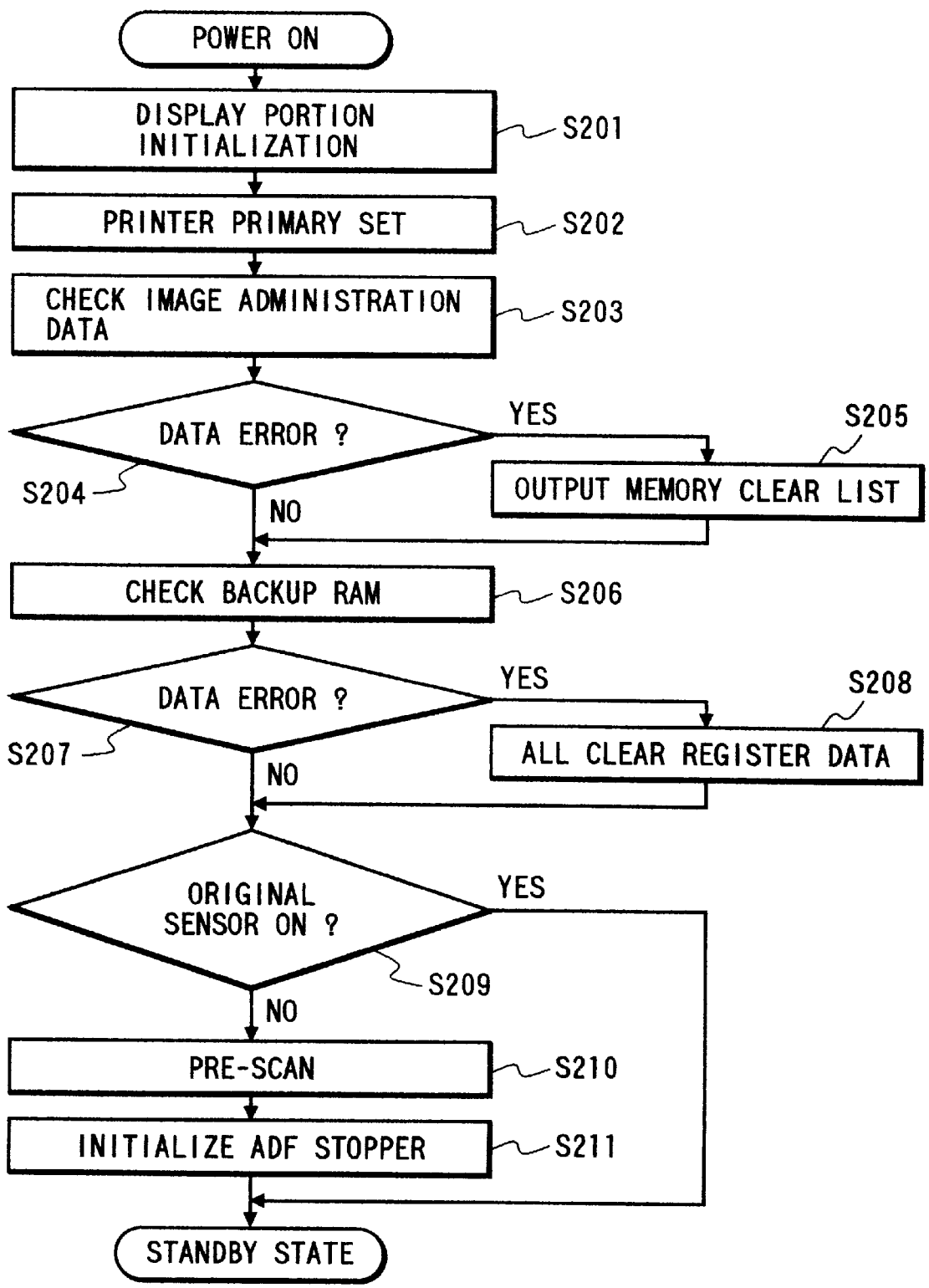
FIG. 14 is a flow chart showing a flow of a process from power ON to standby state, in the facsimile.
Figure 15:
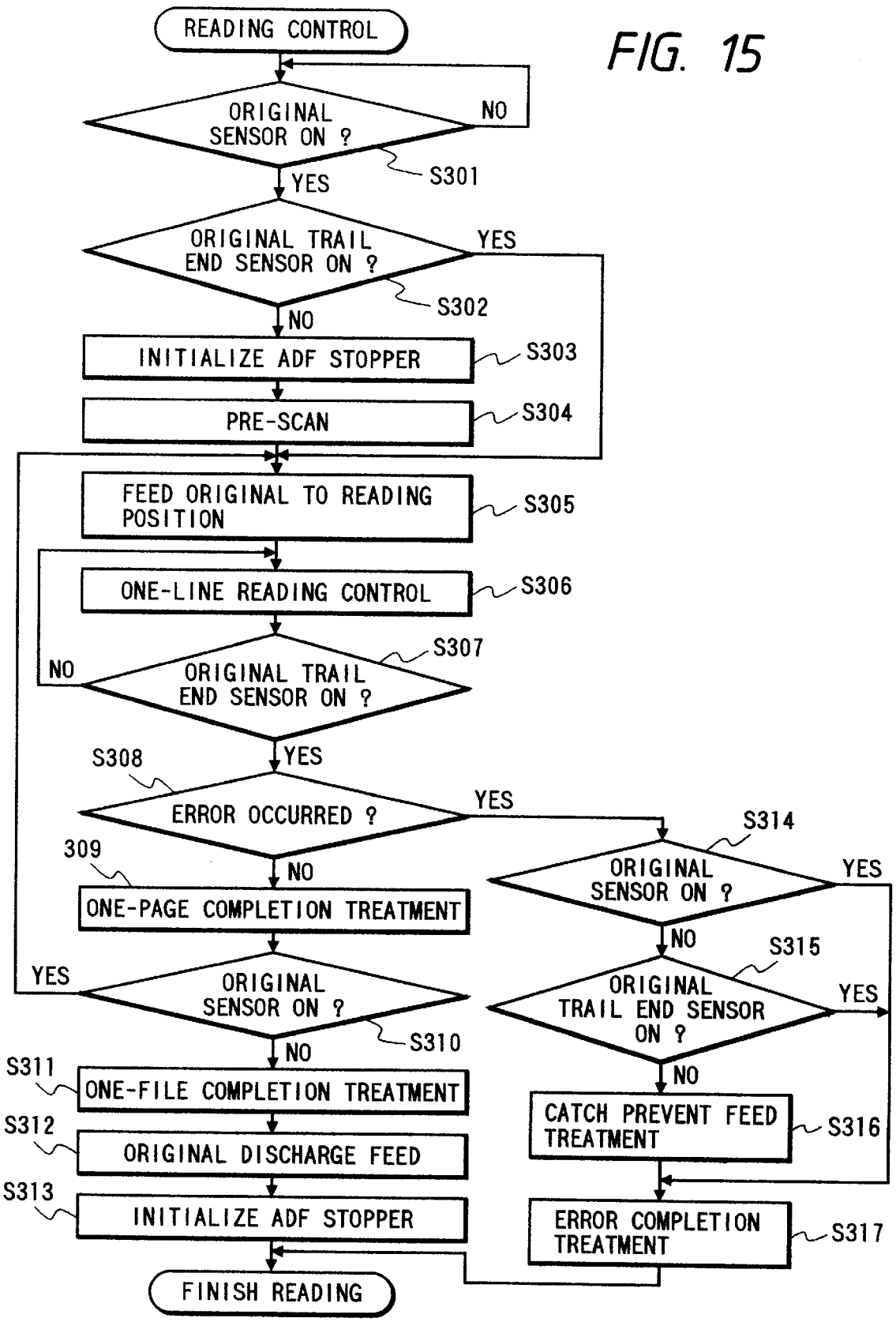
FIG. 15 is a flow chart showing reading control of the facsimile.

Next, a start timing of the initializing operation of the stopper (more specifically, initializing operations at the power ON, at the setting of the original stack and after the end of the reading) will be explained with reference to FIGS. 14 and 15.

Figure 5:
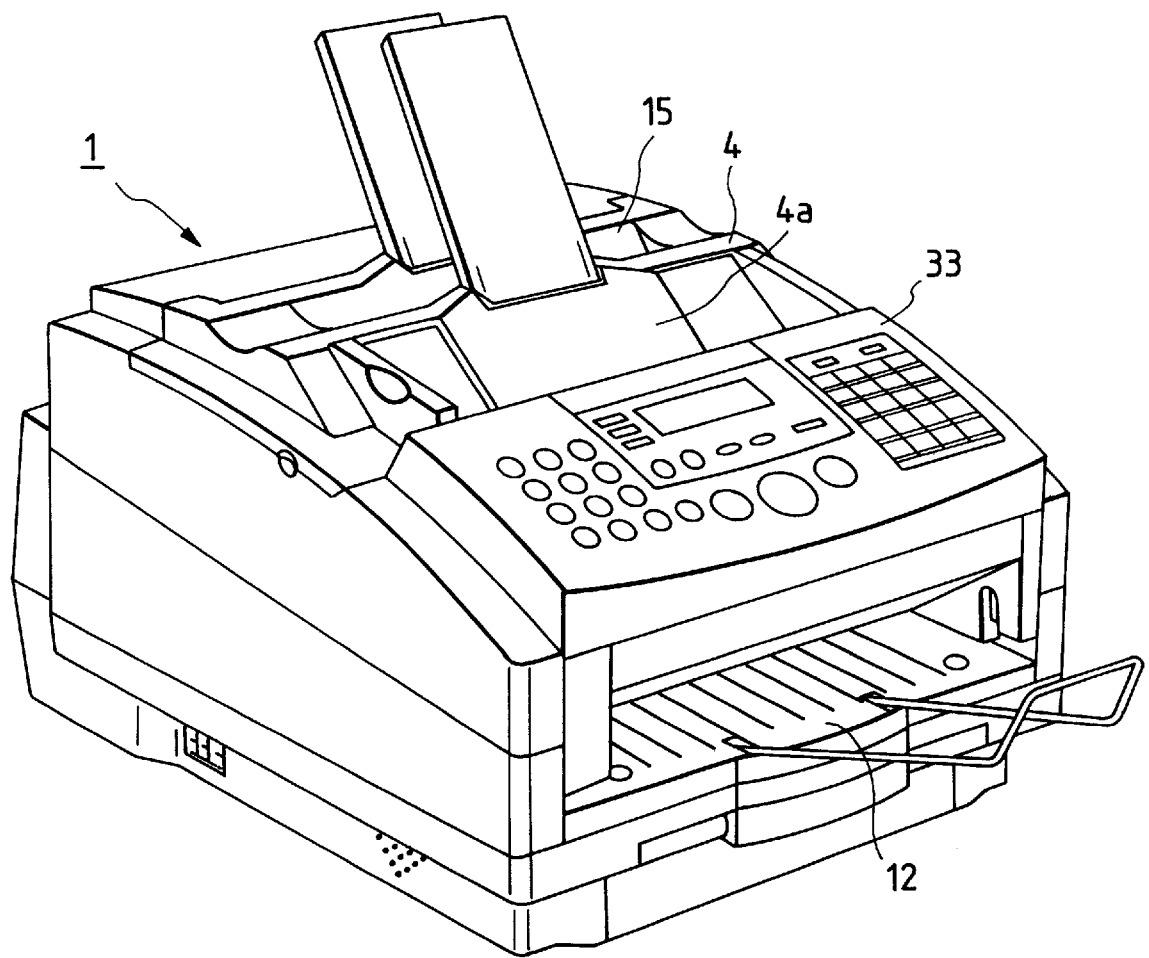
FIG. 5 is a perspective view of the facsimile having the automatic original supplying apparatus to which the present invention is applied.

First of all, a flow chart shown in FIG. 14 will be described. After the power is turned ON, the initialization of the display portion of the operate portion 33 (refer to FIG. 5) is performed to display the power rising-up time (for example, "PLEASE WAIT") (step S201). Then, the initial (primary) setting of the printer portion (image recording portion 3) is performed and the printer is monitored until it reaches the waiting condition (step S202). Then, propriety of the image administration data is checked and it is ascertained the image memories are reserved (step S203). In this case, if data error is detected (step S204), all of the image memories are cleared, the image administration data is initialized, and a memory clear list is outputted (step S205). Then, check sum of a backup RAM for administering register data is calculated and the calculated value is compared with a value in a check sum storing area (step S206). If both values are not equal to each other (step S207), a default value of the register data is re-stored in a register area (step S208). Thereafter, if the original presence/absence sensor indicates the absence of the original (step S209), pre-scan for reading white Myler as a white base reference and for storing the read data into the RAM of the scanner portion as shading correction data is performed (step S210). Then, the initialization control of the stopper as mentioned above (refer to FIG. 10) is performed (step S211). After the initialization is finished, the program goes to a standby state in which the operator can input any command and clock is displayed.

Next, a flow chart shown in FIG. 15 will be described.

While the original presence/absence sensor (DS) 19a is indicating the original absence condition (step S301), the reading waiting condition is maintained. When the sensor 19a indicates the original presence condition, the reading control is started. If the original trail end sensor (DES) 19b is turned ON (step S302), since there is the possibility that the original exceeds beyond the original set position to reach the vicinity of the reading position, the pre-scan is not effected. Further, if the original exceeds beyond the stopper 7h, i.e., if the presence of the original is detected by the sensor 19b, since the initialization of the stopper 7h is meaningless or in vain, the initialization is not effected. If the original trail end sensor 19b is turned OFF (step S302), the initialization of the stopper (refer to FIG. 10) is performed (step S303), and the pre-scan is performed (step S304). Then, the original is fed to the reading position including the image sensor 7 of close contact type (CS) (step S305), where the image reading is started. One-line image data is read while effecting one-line feed, and the read data is DMA-transferred to the image buffer.

After the one-line image data is transferred, the one-line is coded. The coded image data is stored in the image memory (step S306). The one-line reading is repeated until the original trail end sensor 19b is turned ON and the reading of the effective range of one page is finished (steps S306 and S307). In the case where any errors during the one-page reading (step S308), if the original sensor 19a is OFF (step S314) and the original trail end sensor 19b is also OFF (step S315), i.e., if the trail end of the original remains in the original convey portion, the original is fed by a predetermined amount and the erroneous original is conveyed out (step S316).

If such a feed treatment is not performed, the trail end of the original will be kept in the original convey portion. In this case, if the initialization of the stopper 7h is performed, the original will be caught, thereby damaging the original. After the catch prevent feed treatment, error alarm is generated and the error is displayed on the display portion (step S317). If there is no error, when the original trail end sensor 19b is turned ON to detect the fact that the one-page reading is finished, the number of read lines of one page is stored in the image administration data memory (step S309). When the original sensor 19a is turned ON, if the next original (next page) is present, the one-page reading control (steps S305 to S309) is repeated (step S310). If there is no next page, the number of pages of the read originals is written in the image administration data, and one-file reading process is ended (step S311). After the originals are completely discharged (step S312), the initializing operation (refer to FIG. 10) of the stopper 7h is performed (step S313), and the program is returned to the reading waiting condition.

As mentioned above, by performing the initializing operation (refer to FIG. 10) of the stopper 7h by several times (more specifically, at the power ON, at the setting of the originals and after the discharge of all originals), even after the sheet jam treatment was effected by opening the upper cover or the side cover, the supply sub-roller 7d and the stopper 7h can surely be returned to their initial positions. Further, any sensor for detecting opening/closing of the opening/closing cover can be omitted, thereby making the facsimile cheaper.

[Other Embodiments]

In the above-mentioned embodiment, while an example that the image forming apparatus is embodied as the facsimile having the communication function was explained, the present invention is not limited to such an example, but may be applied, for example, to any sheet supplying apparatus incorporated into an image output terminal of information processing equipment such as a computer or a copying machine including a reader.

Further, in the above-mentioned embodiment, while an example that the sheet is embodied as the sheet original to be read was explained, the sheet may be a recording sheet to be recorded. In this case, the present invention is applied to a sheet supplying apparatus for successively supplying the recording sheets one by one.

Incidentally, if the supply roller 7c is disposed above the supply sub-roller 7d, a projection may be provided on the supply roller 7c to control the sheet regulating means.

What is claimed is:

1. A sheet supplying apparatus comprising:
a sheet stacking plate on which a plurality of sheets can be stacked;
sheet supply means for supplying the sheets stacked on said sheet stacking plate; and
sheet regulating means for regulating a tip end of the sheets stacked on said sheet stacking plate;
wherein said sheet supply means has a rotary member for supplying the sheet and has a cooperation portion to switch the regulation and release by said sheet regulating means of the tip end of the sheet stack; and
when said rotary member is rotated in a sheet conveying direction, said sheet regulating means is shifted by said cooperation portion to a position where the regulation of the tip end of the sheet stack is released.

2. A sheet supplying apparatus according to claim 1, wherein, when said rotary member is rotated in a reverse direction opposite to the sheet conveying direction, said sheet regulating means is returned, by said cooperation portion, to an initial position where the tip end of the sheet stack is regulated.

3. A sheet supplying apparatus according to claim 2, wherein initialization of said sheet regulating means is performed by several times.

4. A sheet supplying apparatus according to claim 3, wherein initialization of said sheet regulating means is performed at the setting of the sheet stack and after all of the sheets are discharged.

5. A sheet supplying apparatus according to claim 2, wherein a portion of said sheet regulating means is contacted with said cooperation portion in a waiting condition after initialization.

6. A sheet supplying apparatus according to claim 5, wherein, when initialization is finished, said rotary member is stopped and a corresponding drive rotary member is slipped.

7. A sheet supplying apparatus according to claim 1, wherein said rotary member is a driven rotary member urged against a drive rotary member and rotated by rotation of said drive rotary member, and said cooperation portion is a projection provided on said driven rotary member.

8. A sheet supplying apparatus according to claim 7, wherein, when said driven rotary member is rotated in the reverse direction opposite to the sheet conveying direction, said projection abuts against said sheet regulating means to be stopped, with the result that said drive rotary member is rotated while sliding on an outer peripheral surface of said driven rotary member.

9. A sheet supplying apparatus according to claim 8, wherein the fact that said driven rotary member is stopped by abutting said projection against said sheet regulating means is utilized to detect a position of said driven rotary member.

10. A sheet supplying apparatus according to claim 1, wherein rotation control for returning said sheet regulating means to the initial position is performed by rotating said rotary member, firstly in the reverse direction, then in the sheet conveying direction, and lastly in the reverse direction again.

11. A sheet supplying apparatus according to claim 10, wherein rotation control for returning said sheet regulating means to the initial position is performed by rotating said rotary member, firstly in the reverse direction, then in the sheet conveying direction, and lastly in the reverse direction again, by several times.

12. A sheet supplying apparatus according to claim 11, wherein initialization of said sheet regulating means is performed at the setting of the sheet stack.

13. A sheet supplying apparatus according to claim 11, wherein initialization of said sheet regulating means is performed when presence of the sheet is detected by a sheet presence/absence detecting means provided on said sheet stacking plate.

14. A sheet supplying apparatus according to claim 1, wherein said rotary member is a driven rotary member urged against a drive rotary member and rotated by rotation of said drive rotary member.

15. A sheet supplying apparatus according to claim 1, wherein said sheet regulating means is shiftable to the initial position by its own weight.

16. A sheet supplying apparatus according to claim 15, wherein, when said rotary member is rotated in the sheet conveying direction said sheet regulating means is shifted to a lifted position where the regulation is released, and when said rotary member is further rotated in the sheet conveying direction, said sheet regulating means is returned to the initial position by its own weight.

17. A sheet supplying apparatus according to claim 16, wherein said sheet regulating means is upwardly and downwardly rockable.

18. A sheet supplying apparatus according to claim 1, wherein said rotary member is a drive rotary member.

19. A reading apparatus comprising:
a reading means for reading an image on a sheet original; and
a sheet supplying apparatus according to claim 1 for supplying the sheet originals to said reading means one by one.

20. An image forming apparatus comprising:
a reading means for reading an image on a sheet original;
a recording means for recording the read image on a sheet; and
a sheet supplying apparatus according to claim 1 for supplying the sheet originals to said reading means one by one.

21. A sheet supplying apparatus according to claim 1, wherein said sheet supply means has a separation rotary member upstream of said rotary member.

22. A sheet supplying apparatus according to claim 21, wherein said sheet regulating means regulates the tip end of the stacked sheets upstream of said separation rotary member.

23. A sheet supplying apparatus according to claim 22, wherein said cooperation portion is a projection part integrally provided on a shaft of said rotary member.

24. A sheet supply apparatus according to claim 23, wherein said rotary member has a drive roller and a driven roller, and said projection part is located at a side of said driven roller.

25. A sheet supplying apparatus according to claim 24, wherein said driven roller is located at an upstream side, and said sheet regulating means is a lever rockable in an up/down direction to be lowered by own gravity.

26. A sheet supply apparatus according to claim 1, wherein said rotary member has said cooperation portion integrally.

27. A sheet supplying apparatus according to claim 26, wherein said cooperation portion is formed on a shaft of said rotary member integrally.

* * * * *

UNITED STATES PATENT AND TRADEMARK OFFICE
CERTIFICATE OF CORRECTION

PATENT NO.    : 5,915,684
DATED         : June 29, 1999
INVENTOR(S)   : Daigo Nakagawa et al.

It is certified that error appears in the above-identified patent and that said Letters Patent is hereby corrected as shown below:

Title page,
Item [56], FOREIGN PATENT DOCUMENTS, "405338825 and 5-338825" should read -- 405338865 and 5-338865 --.

Column 1,
Line 36, "cheat" should read -- cheap --.

Column 2,
Line 6, "cheat" should read -- cheap --.

Column 8,
Line 65, "predetermined" should read -- predetermined number of --.

Column 10,
Line 60, "Myler" should read -- Mylar --.

Column 14,
Line 4 "claim 1" should read -- claim 1, --;
Line 11, "Claim 1" should read -- claim 1, --; and
Line 31, "own" should read -- its own --.

Signed and Sealed this

Sixth Day of August, 2002

Attest:

JAMES E. ROGAN
Attesting Officer          Director of the United States Patent and Trademark Office